(12) United States Patent
Singhal et al.

(10) Patent No.: US 10,631,184 B2
(45) Date of Patent: *Apr. 21, 2020

(54) SELECTIVE USER PLANE MONITORING MULTIPLE MONITORING PROBES WHEN A SERVING GATEWAY HAS MULTIPLE IP ADDRESSES

(71) Applicant: NetScout Systems, Inc, Westford, MA (US)

(72) Inventors: Anil K. Singhal, Carlisle, MA (US); Bruce A. Kelley, Jr., Westford, MA (US); Rajeev Nadkarni, Chelmsford, MA (US); Narendra Byrapuram, Westford, MA (US)

(73) Assignee: NetScout Systems, Inc, Westford, MA (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/808,762

(22) Filed: Nov. 9, 2017

(65) Prior Publication Data

US 2019/0104426 A1  Apr. 4, 2019

Related U.S. Application Data

(60) Provisional application No. 62/565,946, filed on Sep. 29, 2017.

(51) Int. Cl.
*H04L 1/00* (2006.01)
*H04W 24/08* (2009.01)
(Continued)

(52) U.S. Cl.
CPC ......... *H04W 24/08* (2013.01); *H04L 12/4633* (2013.01); *H04L 43/08* (2013.01);
(Continued)

(58) Field of Classification Search
CPC ..... H04W 24/08; H04W 88/16; H04W 80/04; H04W 84/042; H04W 76/11; H04L 12/4633; H04L 67/10; H04L 43/12
See application file for complete search history.

(56) References Cited

U.S. PATENT DOCUMENTS

2013/0021933 A1* 1/2013 Kovvali ............... H04W 88/18
370/252
2014/0092736 A1  4/2014 Baillargeon
(Continued)

OTHER PUBLICATIONS

Extended European Search Report for European Patent Application No. EP18197722.4, dated Jan. 28, 2019.

*Primary Examiner* — Abdelnabi O Musa
(74) *Attorney, Agent, or Firm* — Locke Lord LLP; Scott D. Wofsy; Christopher J. Capelli

(57) ABSTRACT

A system for selective user plane (UP) monitoring includes a service gateway (SGW) having a plurality of units. The system further includes a network packet broker (NPB) configured to receive packets including UP data from tunnels created to enable transmission of the UP packets from UE to the plurality of SGW units. The NPB is also configured to receive packets including control plane (CP) data from channels enabling transmission of the CP packets from a base transceiver station to the SGW. The system also includes a plurality of probes operatively coupled to the NPB. The probes are configured to generate first metrics associated with the received CP packets and to selectively generate second metrics associated with the received UP packets based on one or more identifiers. The NPB is configured to forward UP packets being processed by a particular SGW unit to a particular probe of the plurality of probes.

20 Claims, 4 Drawing Sheets

(51) Int. Cl.
*H04L 12/46* (2006.01)
*H04L 12/26* (2006.01)
*H04W 88/16* (2009.01)
*H04W 24/04* (2009.01)

(52) U.S. Cl.
CPC .......... *H04L 43/0888* (2013.01); *H04L 43/12* (2013.01); *H04W 24/04* (2013.01); *H04W 88/16* (2013.01)

(56) References Cited

U.S. PATENT DOCUMENTS

| | | |
|---|---|---|
| 2014/0101305 A1 | 4/2014 | Kelley, Jr. |
| 2015/0327091 A1* | 11/2015 | Curtin ................. H04L 43/0811 370/250 |
| 2016/0006625 A1* | 1/2016 | Javed .................... H04L 43/026 370/253 |
| 2016/0352921 A1* | 12/2016 | Ikaheimo .............. H04M 15/41 |
| 2017/0208634 A1* | 7/2017 | Bharatia ........... H04W 72/0406 |
| 2017/0237642 A1 | 8/2017 | Goel |

* cited by examiner

SELECTIVE USER PLANE MONITORING MULTIPLE MONITORING PROBES WHEN A SERVING GATEWAY HAS MULTIPLE IP ADDRESSES

CROSS REFERENCE TO RELATED APPLICATIONS

This application claims priority under 35 U.S.C. § 119 from U.S. Provisional Application No. 62/565,946, entitled "Selective User Plane Monitoring", filed on Sep. 29, 2017.

FIELD OF THE INVENTION

The disclosed embodiments generally relate to monitoring network traffic data, and more particularly, to performing selective user plane monitoring using multiple monitoring probes when a serving gateway has multiple IP addresses.

BACKGROUND

As a result of advances in technology and enormous increases in the number of wireless device users, the size and complexity of wireless communications networks has greatly increased. One consequence of such increases in size and complexity is that the relative increase in operational and performance problems associated with communications networks has also increased. Reliability issues, such as dropped calls, lack of coverage, poor audio quality, and application failure often lead to user frustration and to increased costs. As new services are introduced that use even more complex technology, exercise different usage modalities, and place additional demands on networks, network performance continues to be a prime concern. In fact, quality of service often has a direct impact on a service provider's profitability. Therefore, improving quality of service is a top priority for service providers.

Network monitoring solutions are well known in the art and widely employed by service providers. Typical approach to network monitoring includes placing probes at various points in the network to determine if network elements are functioning according to specification. Sometimes referred to as "sniffers", "log monitors" or "event monitors," these monitoring systems are effective at identifying performance issues with a particular network element, but they often fail to capture problems that stem from the interfaces among network elements.

In a practical network monitoring implementation, however, not all packets that pass through a particular monitoring point are examined in detail, but rather they are sampled (for example, one in every thousand data packets that flow through a sampling point may be examined in detail). In such a scenario, because the various metrics for any given flow are now necessarily expressed as estimates with a mean and a variance, taking the maximum of the data counts will result in an upward or downward bias in the estimated metrics.

The solutions that are currently available can only monitor and diagnose subsets of the overall telecommunications system in limited ways rather than providing a holistic view of network and device performance that may be needed to efficiently identify and resolve quality issues. Accordingly, there is a further need in the art for a reliable and flexible network monitoring approach that processes all relevant data for all subscribers.

SUMMARY

Certain aspects of the present disclosure relate to monitoring network traffic data.

In accordance with a purpose of the illustrated embodiments, in one aspect, a system for selective user plane monitoring in a wireless network includes a service gateway (SGW) having a plurality of units. Each unit has a unique IP address. The system further includes a network packet broker configured to receive a plurality of packets including user plane data from one or more tunnels created to enable direct transmission of the user plane packets from user equipment to the plurality of SGW units. The network packet broker is also configured to receive a plurality of packets including control plane data from one or more channels created to enable transmission of the control plane packets from a base transceiver station to the SGW. The system also includes a plurality of monitoring probes operatively coupled to the network packet broker. The monitoring probes are configured to generate a first plurality of metrics associated with the received control plane packets and configured to selectively generate a second plurality of metrics associated with the received user plane packets based on one or more identifiers. The network packet broker is configured to forward a plurality of user plane packets being processed by a particular SGW unit to a particular monitoring probe of the plurality of probes.

In another aspect, a method for selective user plane monitoring in a wireless network includes receiving, by a network packet broker, a plurality of packets including user plane data from one or more tunnels created to enable direct transmission of the user plane packets from user equipment to a service getaway (SGW) comprising a plurality of units. Each of the plurality of SGW units has a unique IP address. A plurality of packets including control plane data is received by the network packet broker from one or more channels created to enable transmission of the control plane packets from a base transceiver station to the plurality of units of the SGW. The received plurality of user plane packets and the received plurality of control plane packets are transmitted by the network packet broker to a plurality of monitoring probes operatively coupled to the network packet broker. Each subset of user plane packets representing packets being processed by a particular SGW unit is transmitted to a particular monitoring probe of the plurality of probes. A first plurality of metrics associated with the received control plane packets is generated by the plurality of monitoring probes. A second plurality of metrics associated with the received user plane packets is selectively generated by the plurality of monitoring probes based on one or more identifiers.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

DESCRIPTION OF CERTAIN EMBODIMENTS

Figure 1:
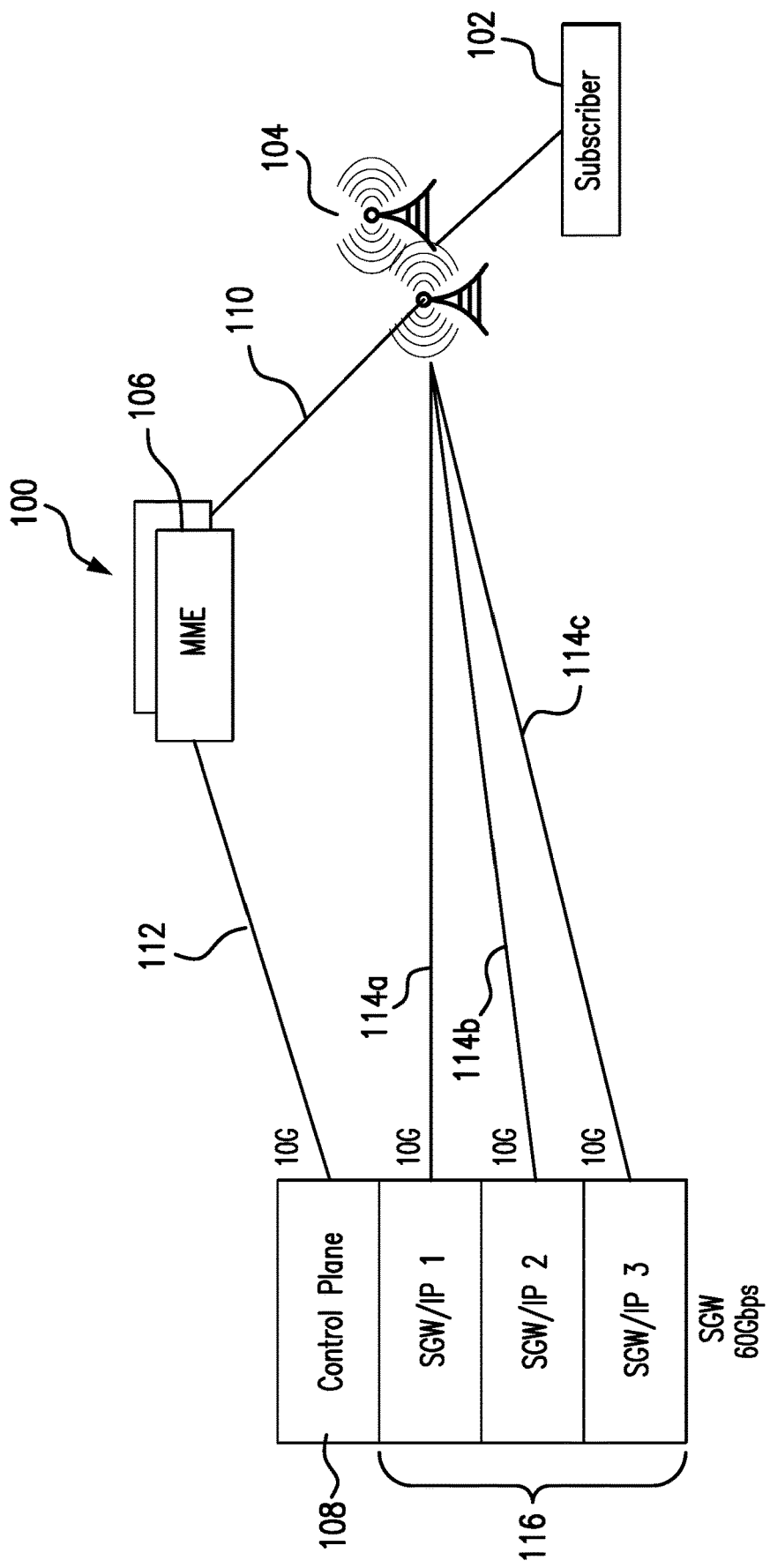
FIG. 1 is a diagram illustrating elements or components of an example operating environment in which embodiments of the present invention may be implemented.

The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In the context of the present description, the terms "network" and "communication network" refer to the hardware and software connecting one or more communication elements including wireline networks, wireless networks, and/or combinations thereof.

FIG. 1 is a diagram illustrating elements or components of an example operating environment in which embodiments of the present invention may be implemented. It is noted that the access network of FIG. 1 is merely one example of a possible access network, and embodiments may be implemented in any of various access networks, as desired.

As shown, the exemplary wireless network 100 includes one or more eNodeBs 104 which communicate over a transmission medium (LTE Uu interface) with one or more user devices 102. User devices may be referred to herein as "user equipment" (UE). Thus, the user devices 102 are referred to as UEs or UE devices. UE devices 102 may comprise any of various types of computer systems or devices which are mobile or portable and which perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

In addition to one or more eNodeBs 104, the access network 100 may include a mobility management entity (MME) 106 and a serving gateway (SGW) 108, among other components. While FIG. 1 depicts a couple of eNodeBs 104 and a single MME 106 and SGW 108, in other implementations, FIG. 1 may include more than two eNodeBs 104, as well as multiple MMEs 106, SGWs 108, etc.

eNodeBs 104 may include one or more devices (e.g., base stations) and other components and functionality that allow UE 102 to wirelessly connect to access network 100. eNodeBs 104 may include or be associated with one or more cells. For example, each cell may include a radio frequency (RF) transceiver facing a particular direction. eNodeBs 104 may interface with access network 100 via an interface referred to as an S1 interface, which may be split into a control plane S1-MME interface 110 and a data plane S1-U interface 114. S1-MME interface 110 may interface with MME device 106. S1-MME interface 110 may be implemented, for example, with a protocol stack that includes a Network Access Server (NAS) protocol and/or Stream Control Transmission Protocol (SCTP). An S1-U interface 114 may interface with SGW 108 and may be implemented, for example, using a General Packet Radio Service Tunneling Protocol version 2 (GTPv2).

MME 106 may implement control plane processing for access network 100. For example, MME 106 may implement tracking and paging procedures for UE 102, may activate and deactivate bearers for UE 102, may authenticate a user of UE 102, and may interface to non-LTE radio access networks. A bearer may represent a logical channel with particular quality of service (QoS) requirements. MME 106 may also select a particular SGW 108 for a particular UE 102. A particular MME 106 may interface with other MMEs in access network 100 and may send and receive information associated with UEs 102, which may allow one MME device to take over control plane processing of UEs serviced by another MME, if the other MME becomes unavailable.

SGW 108 routes and forwards user data packets. SGW 108 acts as the mobility anchor for the user plane during inter-eNodeB 104 handovers. As noted above, SGW 108 and eNodeBs 104 communicate over one or more LTE S1-U links 114a-114c. SGW 108 and MME 106 communicate over an LTE S11 link 112.

In general, SGW 108 may be implemented by a single server, multiple distributed servers, and multiple clustered servers. Optionally, some of the SGW server functions may be provided by a separate server or servers. In the configuration shown in FIG. 1, a blade server is employed to implement SGW 108. The blade server includes multiple server blades 116 that are installed in a common rack or chassis, with each server blade 116 functioning as a separate SGW, each preferably with its own processor(s), memory, network interfaces and its own IP addresses. In one implementation, SGW 108 is configured to load balance user plane sessions across multiple internal SGW blades 116.

The UE 102 typically generates and transmits a request to create a session to the MME 106 over the S1-MME interface 110. In response to receiving the request, the MME 106 generates and transmits a create session request to the SGW 108. The MME 106 communicates the create session request to the SGW 108 over S11 interface 112 that is adapted to accommodate the request.

SGW 108 receives the create session request and selects one of SGWs among a plurality of internal SGWs 116. As noted above, each SGW 116 may be implemented by a separate server blade having its own unique IP address. SGW 108 generates a create session response, which includes an IP address for the selected internal SGW. SGW 108 forwards the response to the MME 106, which transmits the create session response including the IP address for the selected SGW blade to the e-NodeB 104 over the S1-MME interface 110. The eNodeB 104 communicates to the UE 102 that the attach procedure is completed. Thereafter, the eNodeB 104 routes packets between the UE 102 and the IP address included in the received create session response via a corresponding S1a-U interface link 114a-114c.

Figure 2:
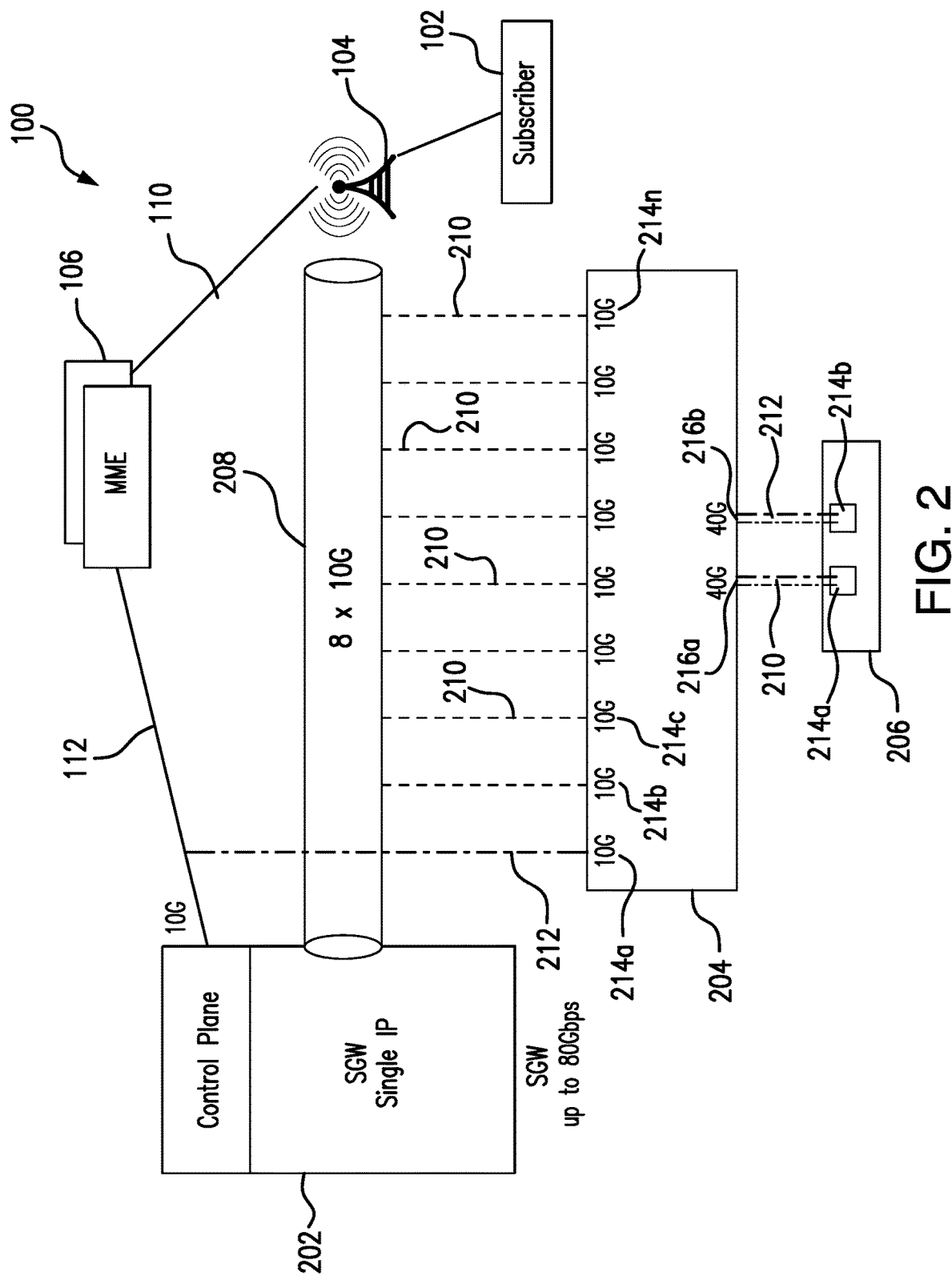
FIG. 2 is a diagram illustrating selective user plane monitoring using a single monitoring probe when a serving gateway has a single IP address, according to an embodiment of the present invention.

FIG. 2 is a diagram illustrating selective user plane monitoring using a single monitoring probe when a serving gateway has a single IP address, according to an embodiment of the present invention. In this embodiment, SGW 202 is implemented using a single server having a single IP address. For illustrative purposes only assume that the hardware capacity limit of the SGW 202 (the maximum throughput in bps that this SGW can handle) is 80 Gbps. In this scenario, the S1-U interface 208 carries the user plane traffic between the eNodeB 104 and the SGW 202. In this embodiment, the user plane IP traffic is carried within encapsulated unidirectional tunnels (e.g., GTP-U) tunnels for specific user's flows. Each user flow has a unique tunnel identifier. The user plane IP traffic is embedded within transport layer addresses (i.e., source and destination IP addresses of the network devices). In one embodiment, the user plane IP traffic is carried within 8 links, each link having maximum throughput of 10 Gbps.

In addition to components 102-112 of the access network 100, FIG. 2 includes components that facilitate monitoring of traffic in the wireless network 100.

More specifically, in this embodiment, one Network Packet Broker ("NPB") 204 is incorporated into the network 100 to facilitate processing of data packets and/or to route data packets to/from network monitoring tools. These monitoring tools may include, for example, network analysis tools, forensic tools, various network monitoring tools, firewalls, malware prevention tools, intrusion detection tools, etc. NPB 204 represents hardware and/or software modules that perform, among other tasks, aggregation of monitored traffic from multiple links, filtering and grooming of traffic to relieve overburdened monitoring tools, load-balancing traffic across a pool of monitoring tools, and regeneration of traffic to multiple monitoring tools. In one embodiment, NPB 204 uses a plurality of taps (not shown in FIG. 2) to capture traffic transmitted within the access network 100. The taps are connections to the various transmission links (e.g., GTP-U tunnels) and are designed to copy packets transmitted through the links and provide the copied packets to the network probe 206 (through the NPB 204) so that the probe 206 can monitor the performance of the network and the quality of the user experience by analyzing the packets. The taps, such as passive taps, filterable taps, and others, include, but are not limited to XFP ports, UTP ports, SFP ports, or other similar means of connecting to the S1a-U interface transmission link 208 and capturing the transmitted packets for analysis.

The NPB 204 shown in FIG. 2 includes a plurality of input ports 214b-214n configured to receive user plane data packets 210 from the plurality of tunnels that carry the user plane IP traffic. In addition, the NPB 204 includes a separate input port 214a configured to receive control plane data packets 212 from the S11 interface 112. In this embodiment each input port 214a-214n has maximum throughput of 10 Gbps.

According to this embodiment, the NPB 204 aggregates both the received user plane data packets 210 and all of the received control plane packets 212 and forwards the aggregated packets to monitoring tools via two output ports 216a and 216b. It is noted that each output port 216a-216b has maximum throughput of 40 Gbps. In other words, the NPB 204 sends all received monitoring load including all received user plane packets 210 and all received control plane packets 212 to monitoring tools.

Generally speaking, currently existing packet brokers can perform basic packet aggregation functions as well as various more advanced packet processing functions on the traffic received from taps, such as removing protocol headers, filtering/classifying packets based on configured rules, and so on. Packet brokers can then transmit the processed traffic to a number of analytic probes/tools, which can carry out various types of calculations and analyses on the traffic in accordance with the business goals/purposes of network (e.g., calculation of KPIs, detection of security threats/attacks in core network, generation of reports, etc.).

Typically, network implementations use dedicated networking hardware (e.g., hardware comprising custom application-specific integrated circuits (ASICs) and/or field-programmable gate arrays (FPGAs)) in order to implement packet brokers. For instance, according to one known approach, a packet broker can be implemented using a device comprising at least one line card that includes an ASIC or FPGA-based packet processor. When the packet broker device receives replicated traffic from taps, the packet broker processes the traffic using the packet processors based on rules that are programmed into hardware memory tables (e.g., content-addressable memory (CAM) tables) resident on the packet processors and/or line cards. The packet broker then forwards the processed traffic onward to probes/tools 206 for analysis.

This hardware-based approach for implementing advanced functionality of a packet broker suffers from several drawbacks. First, the scalability of monitoring network—in other words, its ability to process increasing volumes of traffic from a core network—is necessarily constrained by the hardware capabilities of a packet broker.

For example, if a packet broker is implemented using a chassis-based router that supports up to X line cards, the packet broker cannot scale to support traffic volumes that exceed the capabilities of those X line cards.

Second, since hardware-based packet brokers perform packet processing based on rules that are programmed into hardware memory tables, these packet brokers are generally limited to executing packet processing operations that conform to the semantics of such rules (i.e., attempt to match one or more header fields of an incoming packet and then perform a specified action if a match is made). While these operations can be chained by passing the output of one packet processor/line card to another, the order of the chaining is fixed in hardware. This rigid processing paradigm is problematic if more flexible, complex, and dynamic packet processing operations are desired.

Third, implementing feature changes or additions to a hardware-based packet broker can be costly and time-consuming due to the need to design and validate such changes at the hardware level. This, in turn, makes it more difficult to quickly iterate the packet broker in response to evolving customer needs/requirements and increases the cost of the device for those customers.

Advantageously, various embodiments of the present invention address the aforementioned drawbacks by moving advanced packet processing functions from the hardware-based NPB 204 to a plurality of software-based monitoring tools. This significantly reduces the overall cost of the monitoring infrastructure, and at the same time provides more flexible and dynamic packet processing operations customized to serve specific needs of network operators. Thus, various embodiments described herein contemplate utilization of NPBs 204 with hardware implementations limited to basic packet aggregation functions.

In the illustrated embodiment, a monitoring tool is implemented as a network probe 206. The network probe 206 may be configured as hardware, software, firmware, or combination thereof, for monitoring data transmission through the S1a-U interface 208 and the S11 interface 112. While generally the network probe 206 may be deployed at any of a variety of locations or links of the network 100 to collect network data packets transmitted through the S1a-U interface 208 and the S11 interface 112, in this case the network probes 206 are connected to the network through the NPB 204 which, as described in another embodiment below, may be configured to permit balancing of the load between multiple network probes. The network probe 206 may be configured as a special purpose computing device or a software component (not limited to a single process) dedicated to monitoring data communicated via the network 100. Alternatively, the network probe 206 may be a general purpose computing device with specialized software components installed thereon. In one embodiment, the network probe 206 is a nGenius InfiniStream, available from NetScout Systems, Inc. of Westford, Mass.

In this example, after collecting the packets (user plane and control plane), the network probe 206 selectively generates an Adaptive Service Intelligence (ASI) data set that can include key performance indicators and Adaptive Session Records ("ASRs") as described in U.S. patent application Ser. No. 12/756,638 entitled "Real-Time Adaptive Processing of Network Data Packets for Analysis" and filed on Apr. 8, 2010. The methods and systems described in U.S. patent application Ser. No. 12/756,638 enable the network probe 206 to analyze network performance and end user experience in real-time, without extensive network buffering and analysis.

In one embodiment, the network probe 206 includes two Network Interface Controller (NIC) ports 214a-214b and has maximum throughput of at least 80 Gbps. In other words, the maximum throughput of the entire SGW 202 is less than or equal to the maximum throughput of the network probe 206.

Furthermore, according to an embodiment of the present invention, the network monitoring probe 206 is configured to generate basic KPIs and meta data metrics for all subscribers and for the entire control and user plane traffic and configured to selectively generate advanced KPIs and metadata only for selected subscribers on user plane by using internal filtering techniques. Basic KPIs and meta data metrics may include Key Traffic Indicators (KTIs), such as, but not limited to, volume, utilization rate, and throughput metrics. The advanced set of metrics typically provides additional assistance in troubleshooting and may include, but is not limited to, the following metrics: network errors, network congestion, jitter, latency, transaction response times, timeouts, as well as various quality of service characteristics (e.g., for video and Voice over IP traffic). Keeping track of these metrics typically requires more processing power, thus selective generation of such metrics facilitates better management of resources on each probe. Exact arrangement of various advanced metrics typically depends on the type of network traffic flows being analyzed. Keeping track of these metrics typically requires more processing power, in contrast to the basic KPIs and metadata metrics.

According to an embodiment of the present invention, a list of subscribers (e.g., a whitelist) that requires additional monitoring (advanced set of KPIs) may be either received by the network probe 206 from a different network management system or may be preconfigured at the network probe 206. Examples of subscriber entity identifiers include, but are not limited to, an international mobile equipment identifier (IMEI) and an international mobile subscriber identifier (IMSI). It should be noted that in some embodiments, the list may include a criteria by which subscriber entities may be identified, such as location, handset and application. For example, the provided list may include only application identifiers, in which case the network probe 206 is configured to generate the advanced set of metrics for all subscribers using the specified application (e.g., Facebook). Location identifiers may indicate geographic locations associated with one of eNodeBs 104.

A further advantage of example embodiments is that the monitoring of a subscriber's media experience may be adjusted based on the subscriber's priority, class, subscription level, and so forth. Therefore, if a certain subset of subscribers is paying for a premium experience, it may be critically important to ensure that their service is not impacted by various traffic conditions as compared to those who are paying for a lower experience or are not paying at all.

Figure 3:
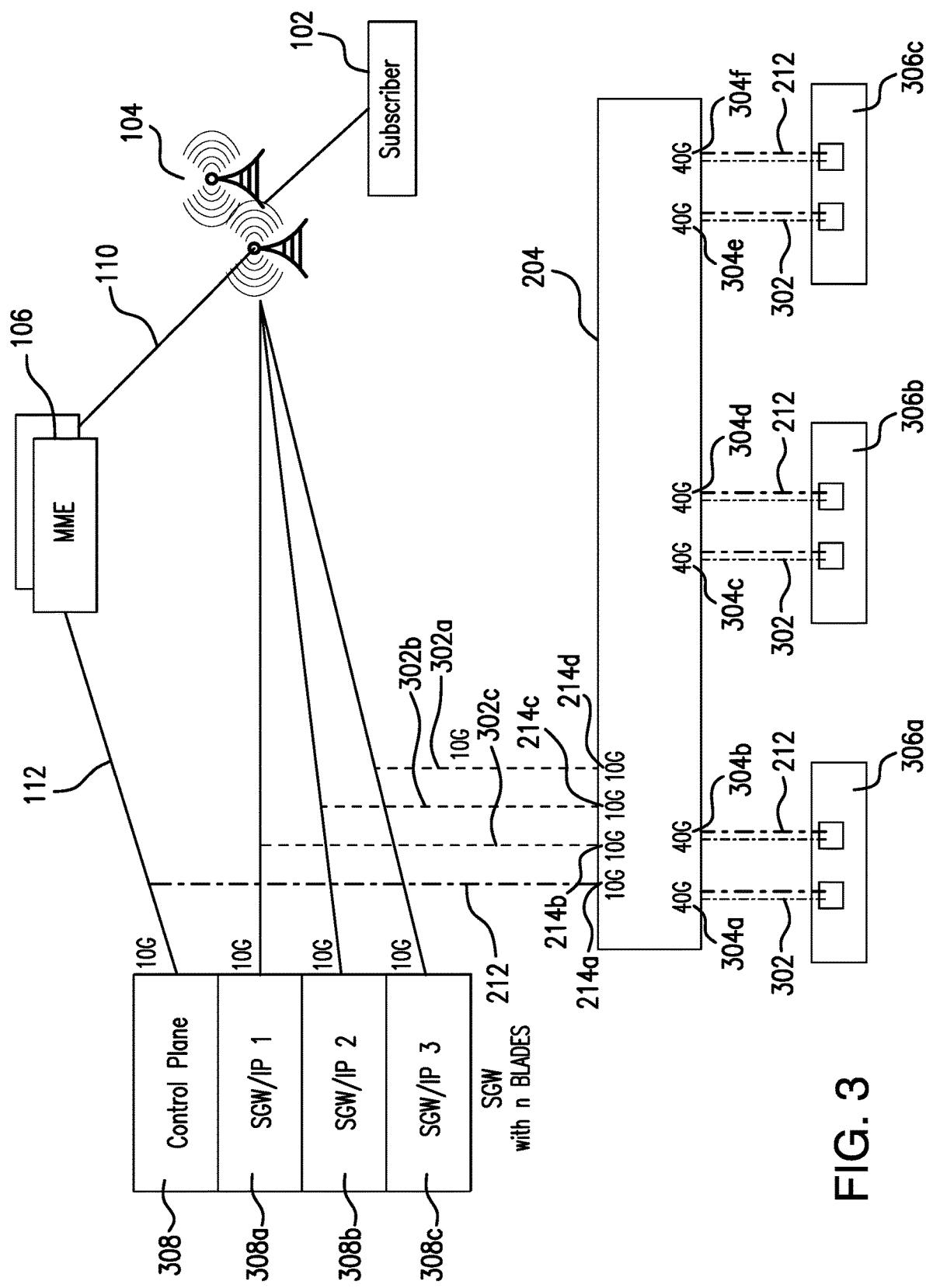
FIG. 3 is a diagram illustrating selective user plane monitoring using multiple monitoring probes when a serving gateway has multiple IP addresses, according to yet another embodiment of the present invention.

FIG. 3 is a diagram illustrating selective user plane monitoring using multiple monitoring probes when a serving gateway has multiple IP addresses, according to yet another embodiment of the present invention. In this embodiment, SGW 308 is implemented using a blade server. In other words, SGW 308 includes multiple server blades 308a-308c that are installed in a common rack or chassis, with each server blade functioning as an internal SGW, each with its own IP address and each performing a subset of SGW functionality. In this embodiment, the user plane IP traffic transmitted between the SGW 308 and the eNodeBs 104 is carried within 3 different links, each link having maximum throughput of 10 Gbps.

As explained above in conjunction with FIG. 1, the SGW 308, in response to receiving a create session request message, selects one of the blades according to a predefined criteria and generates a create session response, which includes an IP address for the selected internal SGW 308a-308c. The SGW 308 forwards the response to the MME 106, which transmits the create session response including the IP address for the selected internal SGW blade to the e-NodeB 104 over the S1-MME interface 110. Thereafter, the eNodeB 104 routes packets between a particular UE 102 and the IP address included in the corresponding create session response via a corresponding S1a-U interface link. In other words, all data plane packets associated with a particular subscriber are routed to a dedicated internal SGW 308a-308c.

The NPB 204 shown in FIG. 3 includes input ports 214b-214d configured to receive user plane data packets 302 from the plurality of S1-U interface links that carry the user plane IP traffic. In addition, the NPB 204 includes a separate input port 214a configured to receive control plane packets 212 from the S11 interface 112. In this embodiment each input port 214a-214d also has maximum throughput of 10 Gbps.

According to this embodiment, the NPB 204 aggregates both the received user plane data packets 302 and all control plane packets 212 for SGW 308. However, in contrast to embodiment shown in FIG. 2, the NPB 204 performs load balancing between various network probes 306a-306c. In one embodiment, the NPB 204 separates the user plane traffic by IP addresses of the internal SGW blades 308a-308c preferably using IP address filtering methods. In other words, the NPB 204 may route all data packets being handled by the first SGW blade 308a to a first network probe 306a via output ports 304a and 304b, all data packets being handled by the second internal SGW blade 308b to a second network probe 306b via output ports 304c and 304d and may route all data packets being handled by the third internal SGW blade 308c to a third network probe 306c via output ports 304e and 304f. It should be noted that the entire load of the aggregated control plane packets 212 is forwarded to all network probes 306a-306c by the packet broker 204 for correlation purposes. In other embodiments, other criteria may be utilized for load balancing the user plane traffic. In yet other embodiments, the NPB 204 may send the entire user plane traffic to each network probe 306a-306c.

According to an embodiment of the present invention, all the correlations performed collectively by the plurality of network probes 306a-306c can be seen as a sequence of control plane/user plane and control plane/control plane correlations where the control plane/user plane correlation can use, for example, subscriber entity attributes and tunnel identifiers for correlation purposes. According to an embodiment of the present invention, whenever possible, the network probes 306a-306c attempt to correlate the packets based on a tunnel identifier/subscriber entity identifier mapping that can be extracted from the control plane traffic. This correlation is possible only if the subscriber identifier is present in all packets being correlated. Advantageously, in this embodiment the network probes 306a-306c receive only a subset of user plane data, but because they also receive all control plane packets 212 containing mappings between subscriber identifiers and tunnel identifiers, there is guaranteed to be a match for control plane/user plane correlation purposes.

In this embodiment, the maximum throughput of each individual SGW blade 308a-308c is less than or equal to the maximum throughput of the corresponding network probe 306a-306c. For example, if each SGW blade 308a-308c has maximum throughput of 10 Gbps, the network probes 306a-306c having maximum throughput of 80 Gbps can be used in this configuration. As noted above, each network probe 306a-306c processes user plane traffic for a specific SGW blade 308a-308c and each network probe 306a-306c processes the entire control plane traffic.

In an alternative embodiment, each network probe 306a-306c may receive the entire user plane traffic and may perform internal load balancing by selecting a subset of the received user plane traffic using, for example, odd/even classification of packets (in case of a two probe configuration) or using conventional hashing techniques.

Furthermore, according to an embodiment of the present invention, each network monitoring probe 306a-306c is configured to generate basic KPIs and meta data metrics (e.g., KTIs) for the entire user plane traffic and is preferably configured to perform additional filtering and selectively generate advanced KPIs and metadata only for selected subscribers on user plane sessions, either by subscriber or by application, as described above. Advantageously, each network probe 306a-306c discards a portion of the user plane traffic that is not relevant to the generation of advanced KPIs and may also optionally discard a portion of the control plane traffic that is not relevant to the generation of advanced KPIs, as described below in conjunction with FIG. 4. It should be noted that in various embodiments each network probe 306a-306c may either have its own unique list of subscribers for selective generation of advanced metrics or may each have the same global list of subscribers. In some cases, subscriber's sessions may be handed over from one e-NodeB 104 to another. As a result, subscriber's user plane traffic may be rerouted by the SGW 308 to a different blade 308a-308c. Thus, if the NPB 204 separates the user plane traffic by IP addresses of the internal SGW blades 308a-308c then a subset of subscriber's user plane data may be rerouted to a different network probe 306a-306c as well. In this scenario, a global list of subscribers shared by all network probes 306a-306c enables complete analysis of the entire user plane data for that particular subscriber even if that data is spread out between the network probes 306a-306c.

It is to be appreciated, scalability is one of the advantages of the embodiment illustrated in FIG. 3. Each wireless network service provider may utilize a different number of SGW blades 308 a-c and a corresponding number (e.g., matching number) of network probes 306a-306c.

Figure 4:
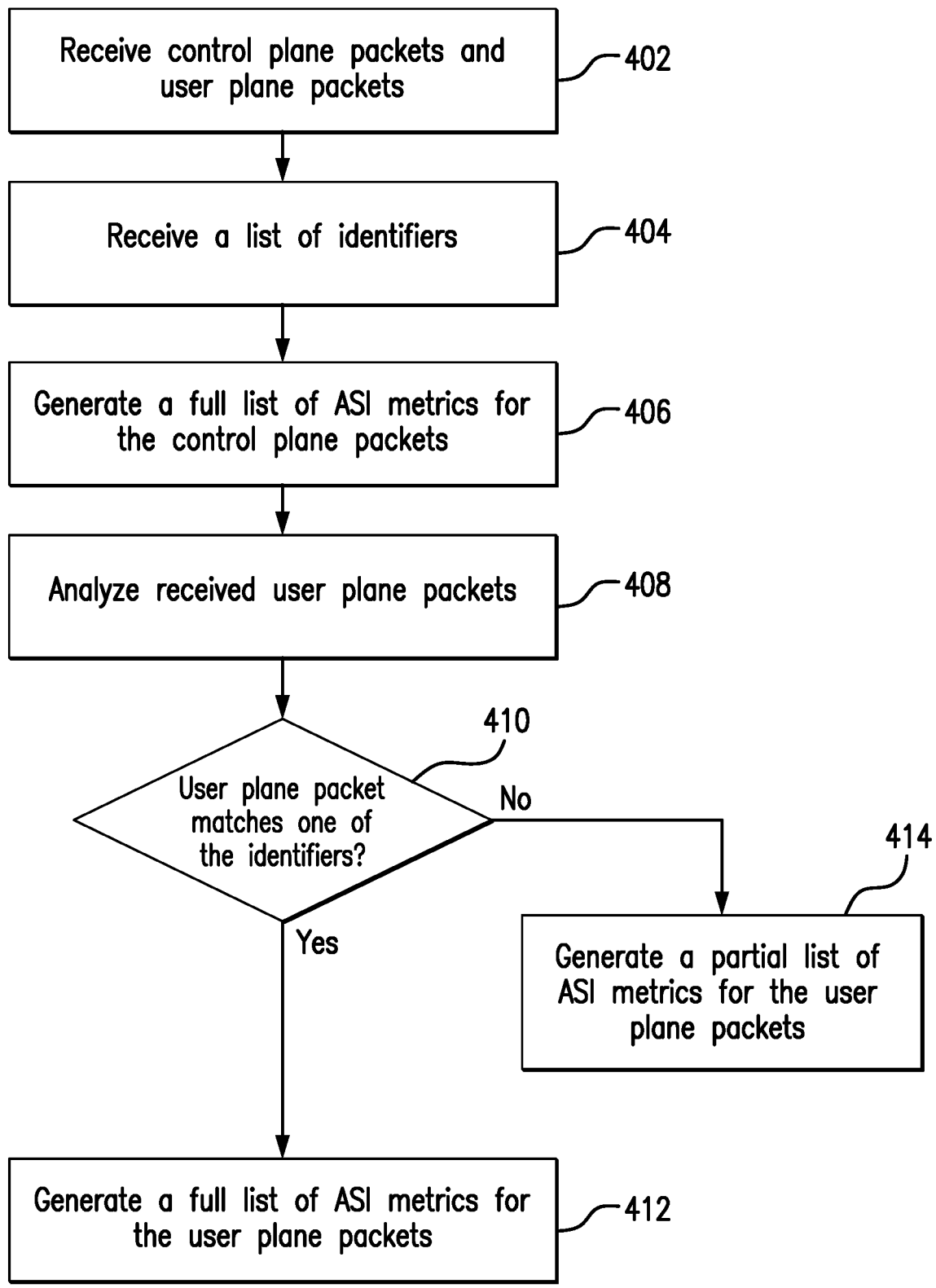
FIG. 4 is a flowchart illustrating steps performed by the monitoring probe, according to an embodiment of the present invention.

Before turning to description of FIG. 4, it is noted that the flow diagram shown therein is described, by way of example, with reference to components shown in FIGS. 1-3, although these operational steps may be carried out in any system and are not limited to the scenario shown in the aforementioned figures. Additionally, the flow diagram in FIG. 4 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included. Although the operational steps below are described as being performed by network probe 306 in FIG. 3, the same sequence of operational steps may be carried out by network probe 206 illustrated in FIG. 2.

As shown in FIG. 4, at step 402, the network probe 306 starts the method by receiving the entire set of control plane packets 212 and receiving at least a subset of user plane packets 302. More, specifically in embodiments illustrated in FIG. 2 the network probes 206 receive the entire load of the user plane traffic, while the network probes 306 shown in FIG. 3 may receive either entire user plane traffic or only user plane traffic for a specific SGW blade 308a-308c.

Next, at step 404, the network probe 306 obtains a list of identifiers indicating specific subscribers of interest. Examples of subscriber entity identifiers include, but not limited to, IMEI and IMSI. It should be noted that in some embodiments, the list may include a criteria by which subscriber entities may be identified, such as location, handset and application. For example, the provided list may include only application identifiers, in which case the network probe 306 is configured to generate the advanced set of metrics for all subscribers using the specified application.

In an embodiment, at 406, the network probe 306 generates a full list of ASI metrics for the received control plane packets. The full list of ASI metrics may include some basic KPIs and ASRs for control plane traffic. Since volume of control plane traffic is substantially smaller than volume of user plane traffic computational time for generation of ASI metrics for the received control plane packets is negligible as compared to computational time for generation of ASI metrics for the received user plane packets. In some embodiments, instead of generating the full list of ASI metrics for all control plane packets, the network probe 306 may be configured to generate a subset of ASI metrics that are relevant to the provided list of identifiers indicating specific subscribers of interest.

At 408, the network probe 306 analyzes a plurality of received user plane packets. In one embodiment, the network probe 306 processes the header of each packet if that packet is part of the network flow associated with a subscriber of interest. At step 410, the network probe 306 determines if the analyzed user plane packet matches at least one of the identifiers included in the list of identifiers (e.g., subscriber's identifier).

In response to identifying all user plane packets that match at least one of the identifiers (decision block 410, Yes branch), at step 412, the network probe 306 generates a full list of advanced ASI metrics for all aggregated user plane packets matching at least one of the identifiers. In response to accumulating a plurality of user plane traffic not matching at least one of the identifiers (decision block 410, No branch), at step 414, the network probe 306 generates a list of basic KPIs and KTIs, such as, but not limited to, volume, utilization ratio, and throughput metrics.

In various embodiments, the generated metrics may be presented to a user via a GUI interface or such metrics may be saved to a different system for storage (i.e. a repository).

In summary, various embodiments of the present invention are directed to a monitoring system facilitating monitoring of control and user plane traffic in a wireless network. Advantageously, monitoring probes are configured to generate metrics for the entire control plane packets and to selectively generate a set of advanced metrics for all subscribers of interest. Subscribers of interest are determined based on a predefined list or based on a criterion that enables to identify a subset of subscribers. Furthermore, various embodiments of the present invention enable load balancing of user plane traffic in either automated or manual fashion.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for selective user plane monitoring in a wireless network, the system comprising:
a service getaway (SGW) having a plurality of blade units, each blade unit having at least one processor, a memory and a unique IP address;
a network packet broker configured to receive a plurality of packets each associated with a subscriber identifier comprising user plane data from one or more tunnels created to enable direct transmission of the user plane packets from user equipment to the plurality of SGW units and configured to receive a plurality of packets comprising control plane data from one or more channels created to enable transmission of the control plane packets from a base transceiver station to the SGW; and
a plurality of monitoring probes operatively coupled to the network packet broker, the monitoring probes are configured to generate same control plane metrics associated with the received control plane packets for all subscriber identifiers and configured to generate a first plurality of user plane metrics associated with the received user plane packets for all subscriber identifiers and selectively generate a second plurality of user plane metrics for a subset of the subscriber identifiers wherein the second plurality of user plane metrics is different than the first plurality of user plane metrics identifiers,
wherein the network packet broker is configured to forward a plurality of user plane packets being processed by a particular SGW unit to a particular monitoring probe of the plurality of probes.

2. The system of claim 1, wherein the SGW comprises a blade server and wherein each of the plurality of SGW units comprises a blade.

3. The system of claim 1, wherein the one or more tunnels comprise encapsulated unidirectional tunnels and wherein each tunnel is associated with a particular user flow.

4. The system of claim 1, wherein the network packet broker comprises a plurality of input ports having a collective throughput equal to or greater than collective throughput of the plurality of SGW units.

5. The system of claim 1, wherein the network packet broker is operatively connected with each of the plurality of monitoring probes via at least two output ports having a collective throughput equal to or less than throughput of the corresponding monitoring probe.

6. The system of claim 5, wherein each of the at least two output ports of the plurality of monitoring probes has maximum throughput of approximately 40 GigaBytes per SECond (Gbps).

7. The system of claim 1, wherein the one or more identifiers include at least one of subscriber identifiers, location identifiers, user equipment identifiers or application identifiers.

8. The system of claim 7, wherein the subscriber identifiers comprise at least one of an international mobile equipment identifier (IMEI) and an international mobile subscriber identifier (IMSI).

9. The system of claim 1, wherein the received control plane packets include mappings between a plurality of subscriber identifiers and a plurality of tunnel identifiers and wherein the plurality of monitoring probes is further configured to correlate the received user plane packets with the received control plane packets using the mappings.

10. The system of claim 1, wherein the network packet broker is configured to forward all of the user plane packets to each monitoring probe of the plurality of probes.

11. A method for selective user plane monitoring in a wireless network, the method comprising steps of:
receiving, by a network packet broker, a plurality of packets comprising user plane data from one or more tunnels created to enable direct transmission of the user plane packets from user equipment to a service getaway (SGW) comprising a plurality of blade units, each of the plurality of units having a unique IP address;
receiving, by the network packet broker, a plurality of packets each associated with a subscriber identifier comprising control plane data from one or more channels created to enable transmission of the control plane packets from a base transceiver station to the plurality of units of the SGW;
transmitting, by the network packet broker, the received plurality of user plane packets and the received plurality of control plane packets to a plurality of monitoring probes operatively coupled to the network packet broker, wherein user plane packets representing packets being processed by a particular SGW blade unit is transmitted to a particular monitoring probe of the plurality of probes;
generating, by the plurality of monitoring probes, same control metrics associated with the received control plane packets for all subscriber identifiers; and
generating, by the plurality of monitoring probes, a first plurality of user plane metrics associated with the received user plane packets for all subscriber identifiers and selectively generate a second plurality of user plane metrics for a subset of the subscriber identifiers wherein the second plurality of user plane metrics is different than the first plurality of user plane metrics identifiers.

12. The method of claim 11, wherein the SGW comprises a blade server and wherein each of the plurality of SGW units comprises a blade.

13. The method of claim 11, wherein the one or more tunnels comprise encapsulated unidirectional tunnels and wherein each tunnel is associated with a particular user flow.

14. The method of claim 11, wherein the network packet broker comprises a plurality of input ports having a collective throughput equal to or greater than collective throughput of the plurality of SGW units.

15. The method of claim 11, wherein the network packet broker is operatively connected with each of the plurality of monitoring probes via at least two output ports having a collective throughput equal to or less than throughput of the corresponding monitoring probe.

16. The method of claim 15, wherein each of the at least two output ports of the plurality of monitoring probes has maximum throughput of approximately 40 GigaBytes per SECond (Gbps).

17. The method of claim 11, wherein the one or more identifiers include at least one of subscriber identifiers, location identifiers, user equipment identifiers or application identifiers.

18. The method of claim 17, wherein the subscriber identifiers comprise at least one of an international mobile equipment identifier (IMEI) and an international mobile subscriber identifier (IMSI).

19. The method of claim 11, further comprising the step of correlating, by the plurality of monitoring probes, the received user plane packets with the received control plane packets using mappings between a plurality of subscriber identifiers and a plurality of tunnel identifiers, wherein the correlating step is performed prior to the steps of generating the first plurality of metrics and selectively generating the second plurality of metrics and wherein the received control plane packets include the mappings.

20. The method of claim 11, wherein the step of transmitting further comprises transmitting, by the network packet broker, all of the user plane packets to each monitoring probe of the plurality of probes.

* * * * *